(12) United States Patent
Watanabe et al.

(10) Patent No.: US 7,546,347 B2
(45) Date of Patent: Jun. 9, 2009

(54) ELECTRONIC MAIL RECEIVING METHOD, AND DEVICE, PROGRAM AND STORAGE MEDIUM THEREOF

(75) Inventors: Yoshikazu Watanabe, Kawasaki (JP); Yasuyuki Kitada, Kawasaki (JP); Youiti Morimoto, Kawasaki (JP); Susumu Aoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 959 days.

(21) Appl. No.: 10/701,071

(22) Filed: Nov. 5, 2003

(65) Prior Publication Data

US 2004/0143634 A1 Jul. 22, 2004

(30) Foreign Application Priority Data

Nov. 13, 2002 (JP) .............................. 2002-329519

(51) Int. Cl.
*G06F 15/16* (2006.01)
*H04B 1/18* (2006.01)
*H04M 1/725* (2006.01)
*G08B 5/22* (2006.01)

(52) U.S. Cl. .................. 709/206; 709/202; 709/207; 455/186.1; 455/186.2; 455/412.1; 455/412.2; 340/7.52

(58) Field of Classification Search ......... 709/206–207, 709/217, 218, 219, 202; 455/466, 186.1, 455/186.2, 412.1, 412.2; 707/206; 340/7.52
See application file for complete search history.

(56) References Cited

U.S. PATENT DOCUMENTS

| | | | | |
|---|---|---|---|---|
| 5,444,438 A | * | 8/1995 | Goldberg | 340/7.23 |
| 5,473,320 A | * | 12/1995 | DeLuca et al. | 340/7.51 |
| 5,687,216 A | * | 11/1997 | Svensson | 455/412.2 |
| 5,959,542 A | * | 9/1999 | Ishida | 340/7.45 |
| 6,008,738 A | * | 12/1999 | Kudoh | 340/7.55 |
| 6,064,877 A | * | 5/2000 | Yanagida | 455/412.1 |

(Continued)

FOREIGN PATENT DOCUMENTS

JP 10-32854 2/1998

(Continued)

OTHER PUBLICATIONS

Japanese Publication No. 2000-137655 published May 16, 2000.

(Continued)

*Primary Examiner*—Nathan J Flynn
*Assistant Examiner*—Joshua Joo
(74) *Attorney, Agent, or Firm*—Staas & Halsey LLP

(57) ABSTRACT

A determining unit determines a state where a new electronic mail cannot be captured unless protection of an existing electronic mail is released, when the new electronic mail is received, or an inquiry is made to a mail server. The state where a new electronic mail cannot be captured unless protection of an existing electronic mail is released is, for example, is a state where a received electronic mail box is full, and all of existing electronic mails are set to be protected, or the like. A guidance unit makes to a user a notification that the protection must be released, if the determining unit determines the state where a new electronic mail cannot be captured unless the protection of an existing electronic mail is released.

7 Claims, 12 Drawing Sheets

U.S. PATENT DOCUMENTS

| | | | |
|---|---|---|---|
| 6,088,574 A * | 7/2000 | Makino | 340/7.56 |
| 6,192,219 B1 * | 2/2001 | Tada | 340/7.52 |
| 6,420,960 B1 * | 7/2002 | Dorenbosch et al. | 340/7.52 |
| 6,531,956 B2 * | 3/2003 | Ishida | 340/7.52 |
| 2002/0000907 A1 * | 1/2002 | Harano | 340/7.52 |
| 2007/0249325 A1 * | 10/2007 | Blight et al. | 455/412.1 |

FOREIGN PATENT DOCUMENTS

| | | |
|---|---|---|
| JP | 10-78909 | 3/1998 |
| JP | 100707050 A * | 3/1998 |
| JP | 11-8873 | 1/1999 |
| JP | 11-136722 | 5/1999 |
| JP | 11-328059 | 11/1999 |
| JP | 2002-108777 | 4/2002 |
| JP | 2002-312294 | 10/2002 |

OTHER PUBLICATIONS

Japanese Publication No. 2002-180777 published Apr. 12, 2002.
Japanese Publication No. 2000-353129 published Dec. 19, 2000.
U.S. Patent Publication No. 2002-0026485 published Feb. 28, 2002.
Japanese Office Action issued Apr. 1, 2008 in corresponding Japanese Application No. 2002-329519.

* cited by examiner

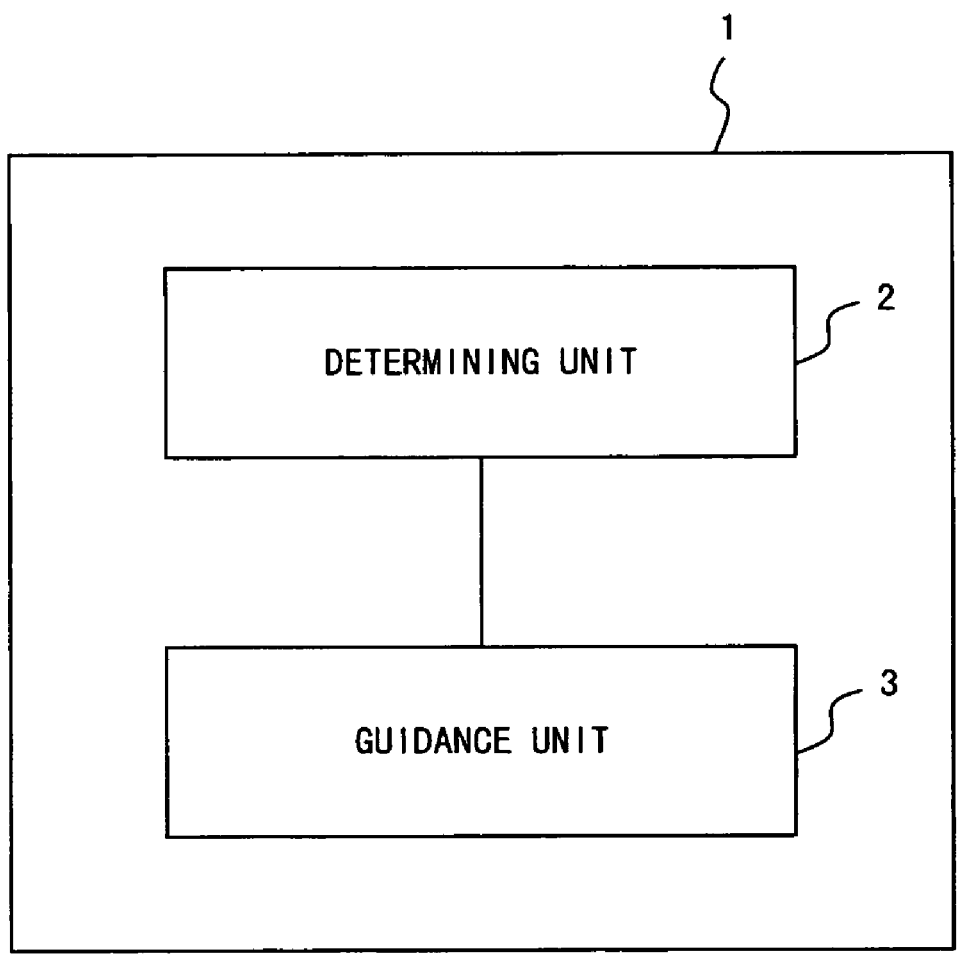
F I G. 1

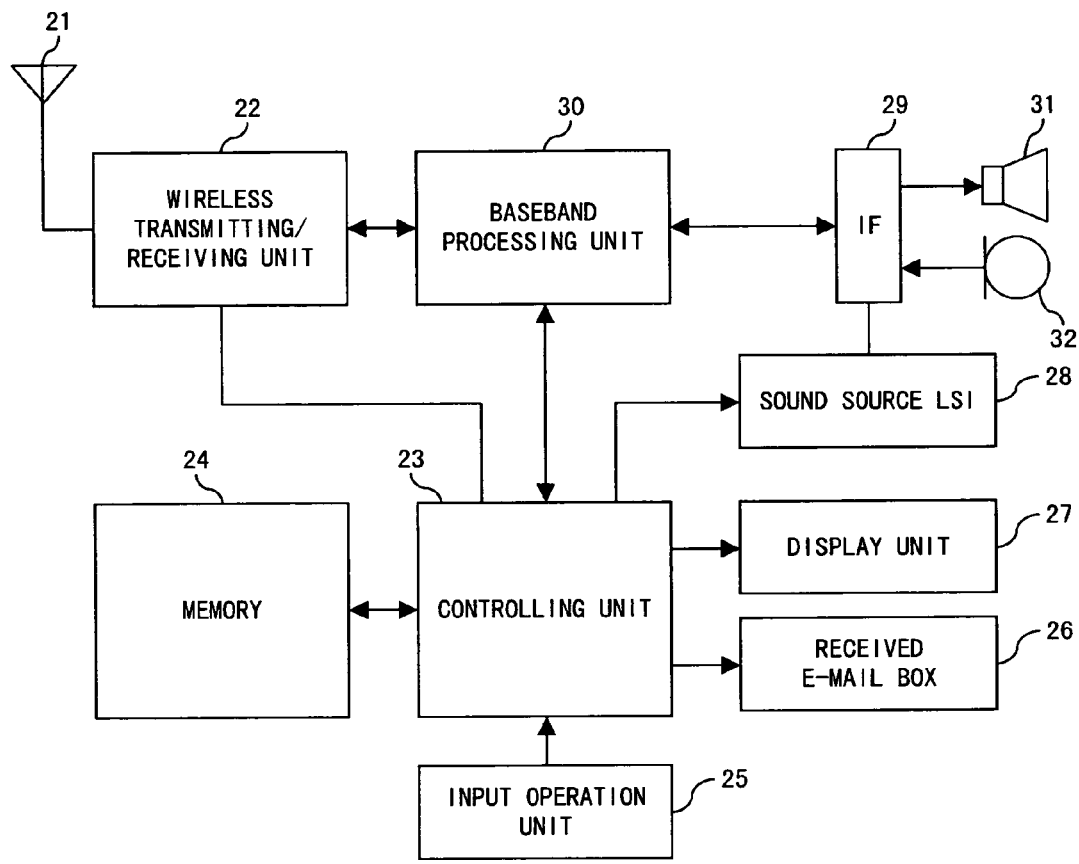
F I G. 2

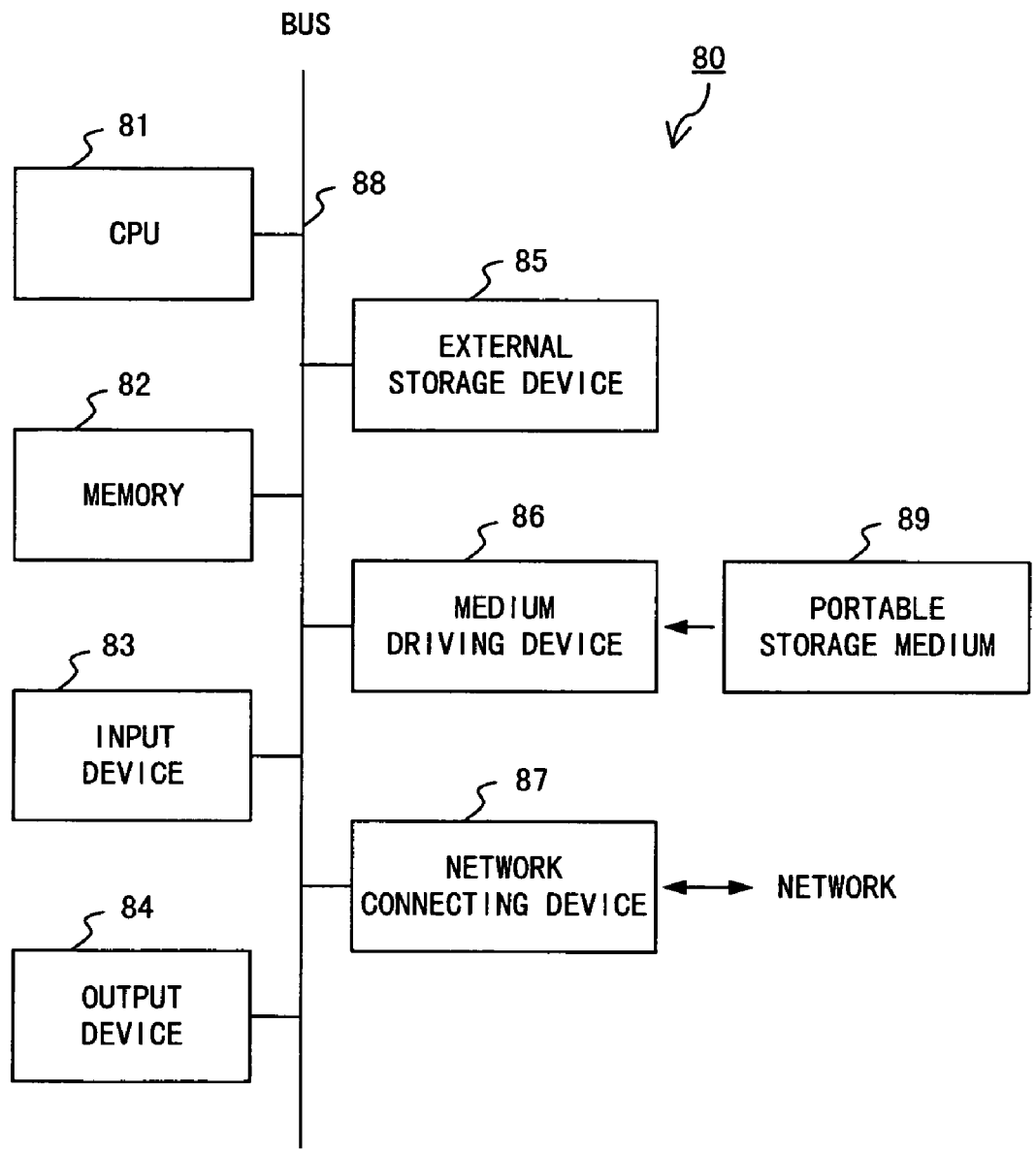
F I G. 1 1

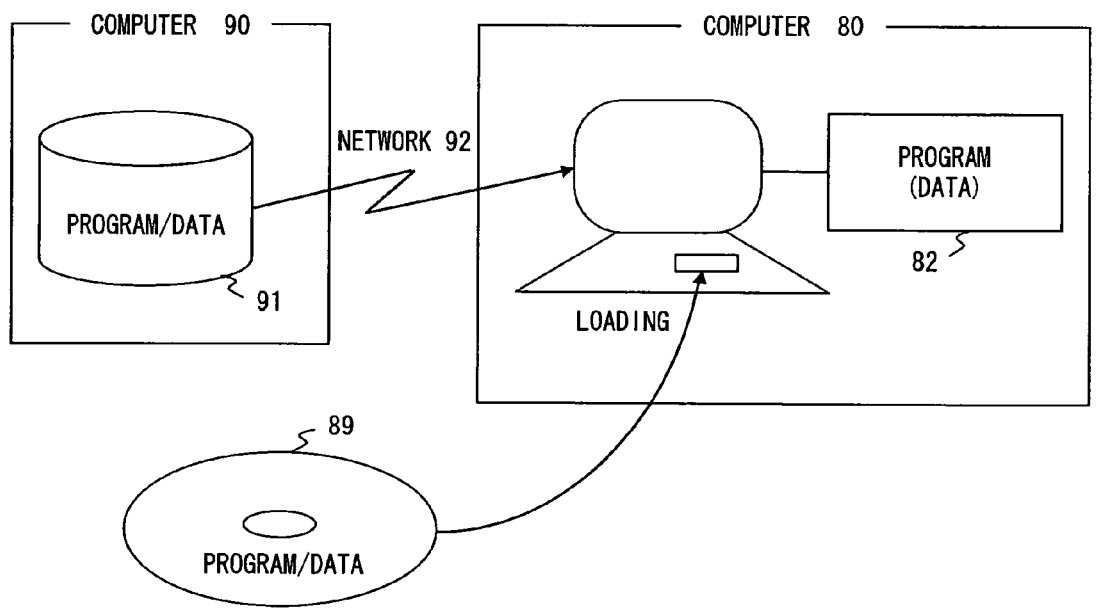
F I G. 1 2

ELECTRONIC MAIL RECEIVING METHOD, AND DEVICE, PROGRAM AND STORAGE MEDIUM THEREOF

BACKGROUND OF THE INVENTION

1. Field of the Invention

The present invention relate to an electronic mail receiving method, etc. in a communications terminal such as a portable telephone, etc.

2. Description of the Related Art

Currently, portable telephones (cellular phone, PHS, etc.) and small portable computers (PDA, etc.) comprise the functions for transmitting/receiving an electronic mail (E-mail) in many cases. Received electronic mails are stored in a received electronic mail box, etc. However, since importance is placed on the portability, and attempts are made to downsize a device in any case, storage space (capacity) is tight (small). If the received electronic mail box becomes full, a new electronic mail cannot be received unless an existing electronic mail is deleted.

To overcome such a problem, for example, the following known techniques are conventionally proposed.

For instance, Patent Document 1 proposes a method with which a deletion is made sequentially from a received electronic mail having older reception date and time until empty space required to receive a new electronic mail is secured according to not the number of electronic mails but the amount of electronic mails, in contrast to a conventional technology with which the number of electronic mails is counted upon receipt of an electronic mail, and a deletion is made sequentially from an electronic mail having older reception date and time if the counted number exceeds a preset number of received electronic mails. Patent Document 1 also proposes a deletion of not only a received electronic mail but also a transmitted electronic mail. Additionally, Patent Document 1 discloses that if required empty space cannot be secured although an electronic mail other than a protected electronic mail, an electronic mail yet to be read, and an electronic mail yet to be transmitted is deleted, a display such that "Memory is full. Delete electronic mail" is made, and a user is made to delete an electronic mail according to his or her judgment.

Additionally, for example, Patent Document 2 proposes a method that protects a user from being unaware that an Internet facsimile to be in a state where the electronic mail cannot be received because memory is full, and from being unable to learn the number of electronic mails that cannot be received and remain in a mail server in the Internet facsimile, etc. Patent Document 2 can urge a user to erase a received electronic mail or a facsimile image stored in a memory by notifying the user of the number of electronic mails that remain in a mail server and cannot be received, or of the state where memory is full.

Furthermore, by way of example, Patent Document 3 proposes a function for enabling a client to set the storage period of an electronic mail, and for deleting each electronic mail based on a set storage period, or a function for preferentially deleting an electronic mail the storage period of which is not set if empty space of an electronic mail box becomes a preset value or smaller. Besides, Patent Document 3 discloses that a warning message indicating that empty space is insufficient is issued, if the empty space does not become a preset value or more although a deletion is made with the above described function.

Still further, for example, Patent Document 4 discloses a technique for the management (space excess detection, space excess warning notification, deletion, etc.) of electronic mails stored in a mail spool area in terms of a mail server.

[Patent Document 1]

Japanese Patent Publication No. 2000-137655

[Patent Document 2]

Japanese Patent Publication No. 2002-108777

[Patent Document 3]

Japanese Patent Publication No. 2000-353129

[Patent Document 4]

Japanese Patent Publication No. HEI11-328059

None of the above described conventional techniques make an effective proposal in the case where a countermeasure cannot be taken with an automatic electronic mail deletion function. Namely, for example, in the case where only electronic mails that cannot be deleted with the automatic electronic mail deletion function exist, such as the case where a received electronic mail box is full and all of its existing electronic mails are set to be protected, or the case where all of electronic mails are only protected electronic mails, electronic mails yet to be read, and electronic mails yet to be transmitted, a display such as "Memory is full. Delete electronic mail" is made, or a warning message indicating that empty space is insufficient is issued. An especially unfamiliar user is difficult to learn a countermeasure, namely, a release of protection, which must be firstly made to delete an electronic mail.

Additionally, if a new electronic mail cannot be captured due to a situation where a received electronic mail box is full and all of existing electronic mails are set to be protected when an inquiry is made to a mail server, a line disconnection automatically occurs, which leads to an error. Although a display is made with pictographic characters, etc., which indicate that a new electronic mail exists in a mail server, or a received electronic mail box is full, an especially unfamiliar user is difficult to learn the reason of an error.

Furthermore, an especially unfamiliar user does not know how to perform an operation itself for releasing protection with confusion. Also for a familiar user, it is desirable to allow such an operation to be performed with as little troublesomeness as possible.

Still further, for a communications terminal having a protection folder which an electronic mail can be distributed to and is a folder dedicated to protected electronic mails, assume that "protection folder and secret" setting is enabled, the number of electronic mails stored in the whole of a received electronic mail box is 80, but the protection folder is full, for example, when the entire received electronic mail box can store up to 100 electronic mails and the protection folder can store up to 50 electronic mails. Also assume that a new electronic mail received in this situation is an electronic mail that must be distributed to the protection folder. In this case, the electronic mail can be captured in the received electronic mail box but not in the protection folder. Therefore, the electronic mail is displayed, for example, at a root, and not made secret, so that it can be possibly viewed by another person.

In the meantime, if an electronic mail is disabled to be captured when it cannot be captured in the protection folder, it is desirable to lead a user to a quick operation that the user can perform without confusion, and allows a new electronic mail to be distributed to the protection folder by releasing the protection of some of electronic mails stored in the protection folder.

SUMMARY OF THE INVENTION

An object of the present invention is to provide an electronic mail receiving method and device that avoid user confusion in judgment, and reduce the troublesomeness of operations if a situation where a countermeasure cannot be taken with a normal automatic electronic mail deletion function, and protection must be released when a new electronic mail is captured occurs. With the electronic mail receiving method according to the present invention, in a communications terminal having an electronic mail reception function, a notification that protection must be released is made to a user if a state where a new electronic mail cannot be captured unless the protection of an existing electronic mail is released is determined when the new electronic mail is received, or an inquiry is made to a mail server.

The state where a new electronic mail cannot be captured unless the protection of an existing electronic mail is released is, for example, a state where a received electronic mail box is full and "protection" is set for all of electronic mails.

As described above, even in the situation where a user must first release the protection of at least one or more existing electronic mails, a notification that the protection must be released is not explicitly made to a user as a countermeasure conventionally. Therefore, an especially unfamiliar user is difficult to learn a countermeasure. However, with the electronic mail receiving method according to the present invention, a notification that protection must be released is explicitly made to a user, so that the user can take a countermeasure without confusion in judgment.

As how to make a notification, for example, a message is displayed, or a voiced notification is made.

Additionally, for instance, in the above described electronic mail receiving method, a minimum number of existing electronic mails for which protection is to be released so as to capture a new electronic mail may be further obtained and notified to a user, and the user may be made to release protection of a plurality of electronic mails together if the protection of the plurality of existing electronic mails is released, when the determination is made.

There may be cases where not a single electronic mail but a plurality of electronic mails exist. For example, if 3 new electronic mails exist in a situation where the received electronic mail box is full and protection is set for all of existing electronic mails, all of the new electronic mails cannot be captured unless protection of at least 3 existing mails is released.

With the above described electronic mail receiving method, a minimum number of existing electronic mails for which protection is to be released is obtained and notified to a user, whereby the user can take a countermeasure without fail. Additionally, protection can be released together for a plurality of electronic mails, whereby troublesomeness of operations for releasing the protection can be reduced.

Furthermore, by way of example, in the above described electronic mail receiving method, a user may be made to release the protection by transferring display contents to a protection release operation screen after the notification is made to the user. The display automatically transfers to the received electronic mail box as described above, thereby reducing the troublesomeness of user operations.

Still further, for example, in the above described electronic mail receiving method, a new electronic mail may be captured by making a deletion sequentially from an existing electronic mail having an older date among electronic mails for which protection has been released. An existing electronic mail for which protection has been released can be deleted with a conventional automatic electronic mail deletion function. Therefore, the existing electronic mail is automatically deleted to secure empty space, so that a new electronic mail can be captured.

Additionally, a communications terminal according to the present invention comprises: a determining unit determining a state where a new electronic mail cannot be captured unless protection of an existing electronic mail is released when the new electronic mail is received, or an inquiry is made to a mail server; and a guidance unit making to a user a notification that the protection must be released if the determining unit determines the state where the new electronic mail cannot be captured unless the protection of an existing electronic mail is released.

Furthermore, by way of example, the guidance unit may be configured to obtain a minimum number of existing electronic mails for which protection is to be released so as to capture a new electronic mail and to notify a user of the obtained number, and to make the user release the protection together for a plurality of existing electronic mails if the protection of the plurality of electronic mails is released.

Note that the above described problems can be solved also by making a computer load a program for causing the computer to perform a control similar to the functions executed by each of the above described configurations according to the present invention from a computer-readable storage medium on which the program is recorded, and by making the computer execute the program.

Namely, the present invention can be configured also as a propagation signal when a program for implementing the above described electronic mail receiving method, or the functions of the communications terminal is downloaded via a transmission line, or as a storage medium on which this program is recorded.

BRIEF DESCRIPTION OF THE DRAWINGS

FIG. 1 is a block diagram showing the functions of a communications terminal according to a preferred embodiment;

FIG. 2 shows the hardware configuration of a cellular phone which implements an electronic mail receiving method according to the preferred embodiment;

FIG. 11 shows the hardware configuration of a computer; and

FIG. 12 exemplifies downloading from a storage medium on which a program is recorded, and downloading of the program.

DESCRIPTION OF THE PREFERRED EMBODIMENT

Figure 3:
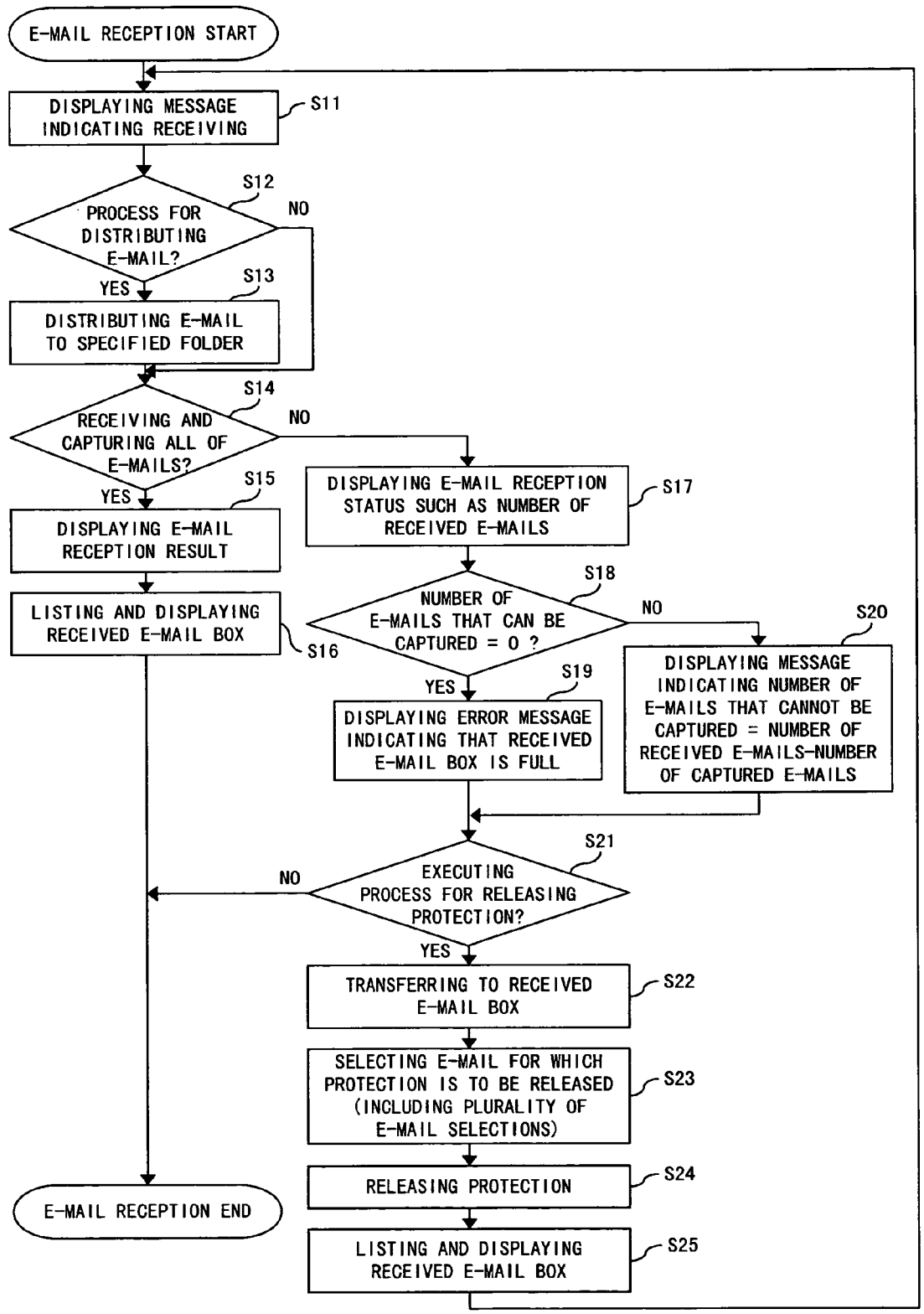
FIG. 3 is a flowchart for explaining a process (when an electronic mail is received) executed by the communications terminal.

A preferred embodiment according to the present invention is described below with reference to the drawings.

An electronic mail receiving method according to the present invention, its device, etc. produce a significant effect particularly when they are applied to a portable telephone (cellular phone, PHS, etc.). In addition, the present invention can be applied to communications terminals having at least an electronic mail reception function, such as a facsimile, a small portable computer (PDA (Personal Digital Assistant), etc.), a normal telephone, a personal computer, etc.

FIG. 1 is a block diagram showing the functions of a communications terminal according to the preferred embodiment.

The communications terminal 1 according to this preferred embodiment comprises a determining unit 2 and a guidance unit 3.

The determining unit 2 determines a state where a new electronic mail (E-mail) cannot be captured unless protection of an existing electronic mail (E-mail) is released when the new electronic mail is received, or an inquiry is made to a mail server. The state where a new electronic mail cannot be captured unless protection of an existing electronic mail is released is, for example, a state where a received electronic mail box is full and protection is set for all of existing electronic mails, or the like.

The guidance unit 3 makes to a user a notification that protection must be released if the determining unit 2 determines the state where a new electronic mail cannot be captured unless protection of an existing electronic mail is released. Conventionally, even in a situation where protection must be released, a notification that "Received electronic mail box is full", "Delete electronic mail", or the like is only made, and an especially unfamiliar user is difficult to learn that the protection must be first released.

In the meantime, the communications terminal 1 according to this preferred embodiment makes to a user a notification that "Protection must be released", whereby even an unfamiliar user can take a countermeasure without confusion.

Additionally, the guidance unit 3 automatically transfers display contents to a protection release operation screen after making the notification, and makes a user release the protection. Display contents are automatically transferred in this way, which eliminates user need to perform an operation for transferring to the protection release operation screen, leading to a reduction in troublesomeness of operations.

Furthermore, the guidance unit 3 obtains a minimum number of existing electronic mails for which protection is to be released so as to capture a new electronic mail, and notifies a user of the obtained number. If protection is released for a plurality of existing electronic mails, the guidance unit 3 makes the user release the protection together for the plurality of electronic mails.

That is, the number of new electronic mails is not limited to 1. For example, if a plurality of new electronic mails exist when a received electronic mail box is full and protection is set for all of existing electronic mails, all of the new electronic mails cannot be captured unless the protection of existing electronic mails, the number of which corresponds to the number of the new electronic mails, is released at the minimum. By making the above described notification, a user can take a countermeasure without confusion to solve such a problem, and avoid a situation where a lack of the number of existing electronic mails for which protection has been released causes same error again.

The functions of the above described determining unit 2 and guidance unit 3 will be described in detail later with reference to the processing steps (functions) represented by the flowcharts shown in FIGS. 3 and 7.

The following description is provided by taking a cellular phone, which is one type of a communications terminal, as an example.

FIG. 2 shows the hardware configuration of a cellular phone 20, which implements the electronic mail receiving method according to this preferred embodiment.

The cellular phone 20 shown in this figure comprises an antenna 21, a wireless transmitting/receiving unit 22, a controlling unit 23, a memory 24, an input operation unit 25, a received electronic mail box (received E-mail box) 26, a display unit 27, a sound source LSI 28, an IF (Interface) 29, a speaker 31, and a mike 32.

Since the respective constituent elements shown in this figure only show a general configuration of a cellular phone, they are not particularly referred to in detail. However, the functions of the communications terminal shown in FIG. 1, namely, the processing functions represented by the flowcharts shown in FIGS. 3 and 7 are implemented in a way such that the controlling unit 23 such as a CPU, etc. executes a program stored in the memory 24. This program may be downloaded from an arbitrary external information processing device via a network. Additionally, a received electronic mail is temporarily stored in the memory 24, its transmission source is checked by the controlling unit 23, and the electronic mail is distributed to each (a corresponding) folder within the received electronic mail box 26 according to the transmission source. Furthermore, user operations referred to in the following description are performed by the input operation unit 25 such as a numeric keypad, etc.

Figure 7:
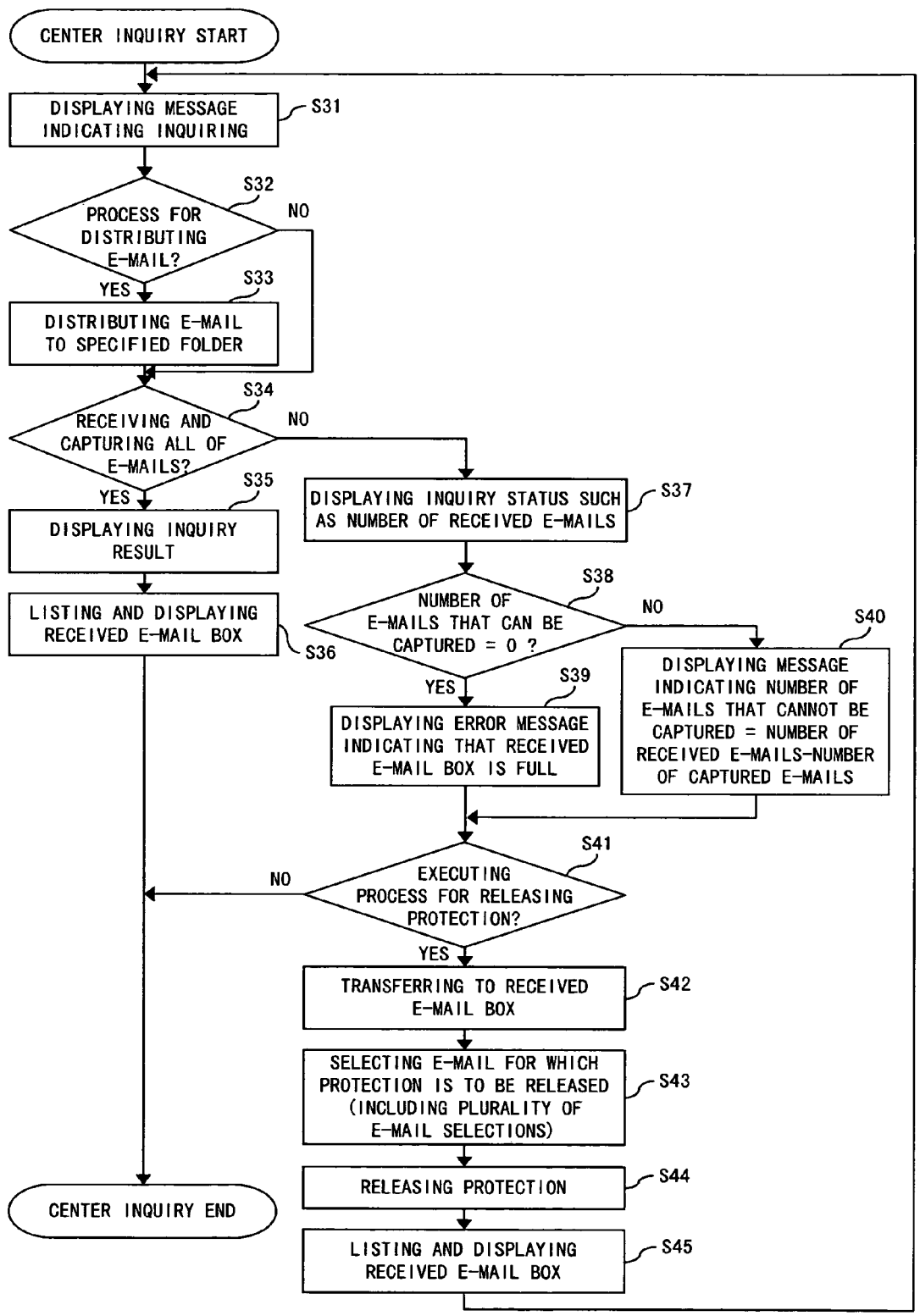
FIG. 7 is a flowchart for explaining a process (when an inquiry is made to a center) executed by the communications terminal.

FIGS. 3 and 7 are flowcharts for explaining the processes executed by the communications terminal. FIG. 3 shows the process executed when an electronic mail is received, whereas FIG. 7 shows the process executed when an inquiry is made to a mail server.

Figure 4:
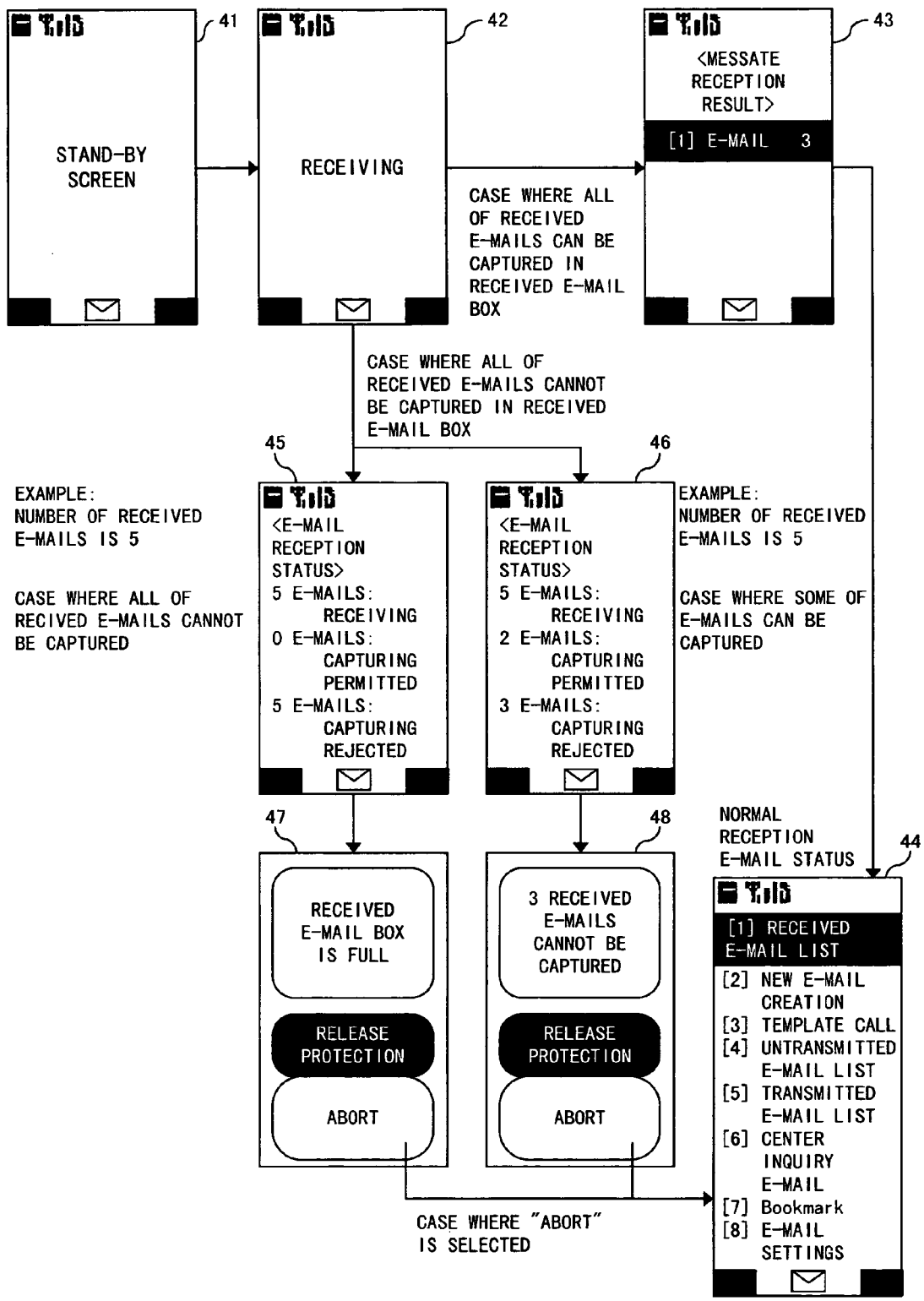
FIG. 4 exemplifies screens displayed on a display unit of the cellular phone during the process shown in FIG. 3 (No. 1)
Figure 5:
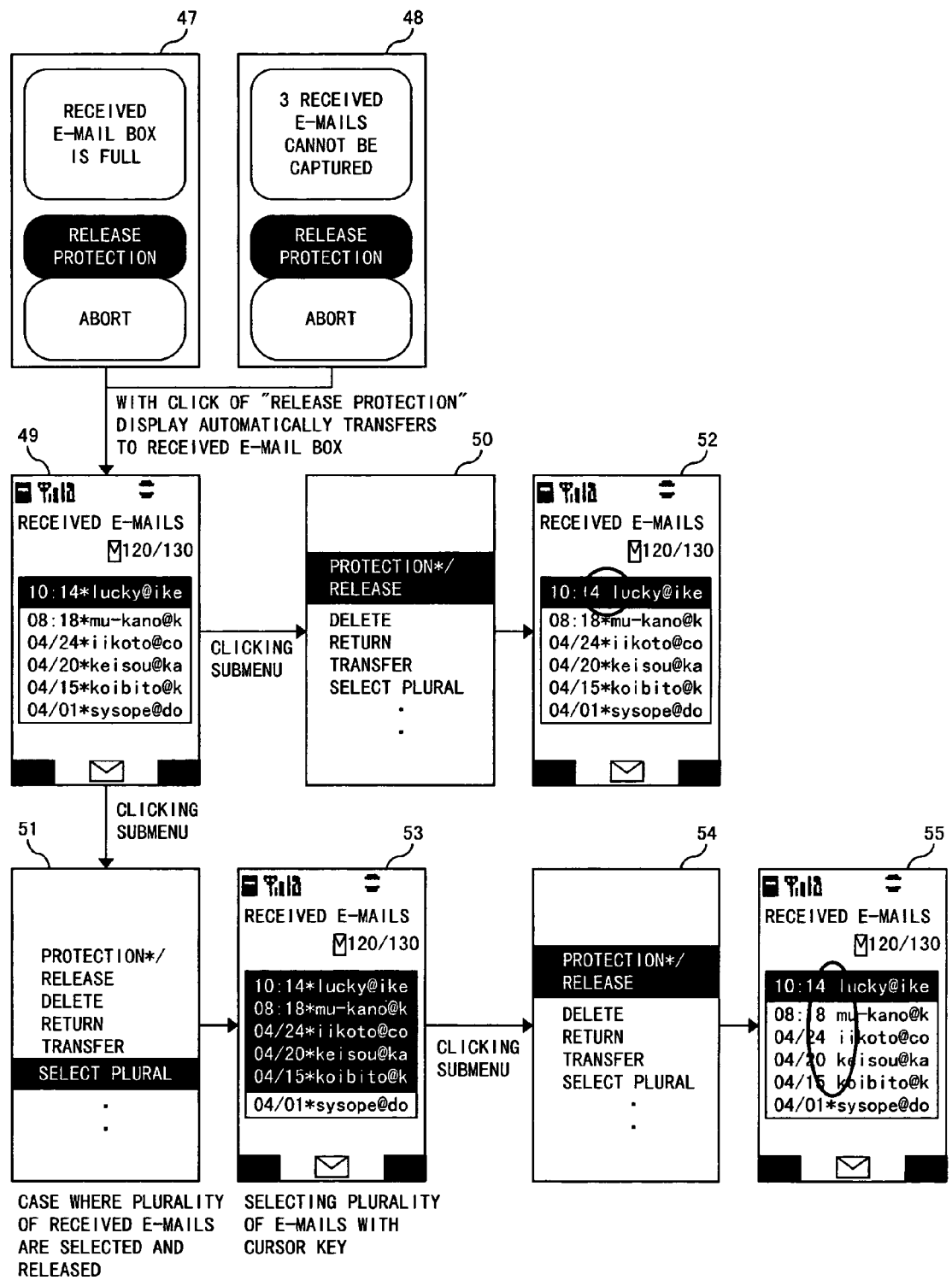
FIG. 5 exemplifies screens displayed on the display unit of the cellular phone during the process shown in FIG. 3 (No. 2)
Figure 6:
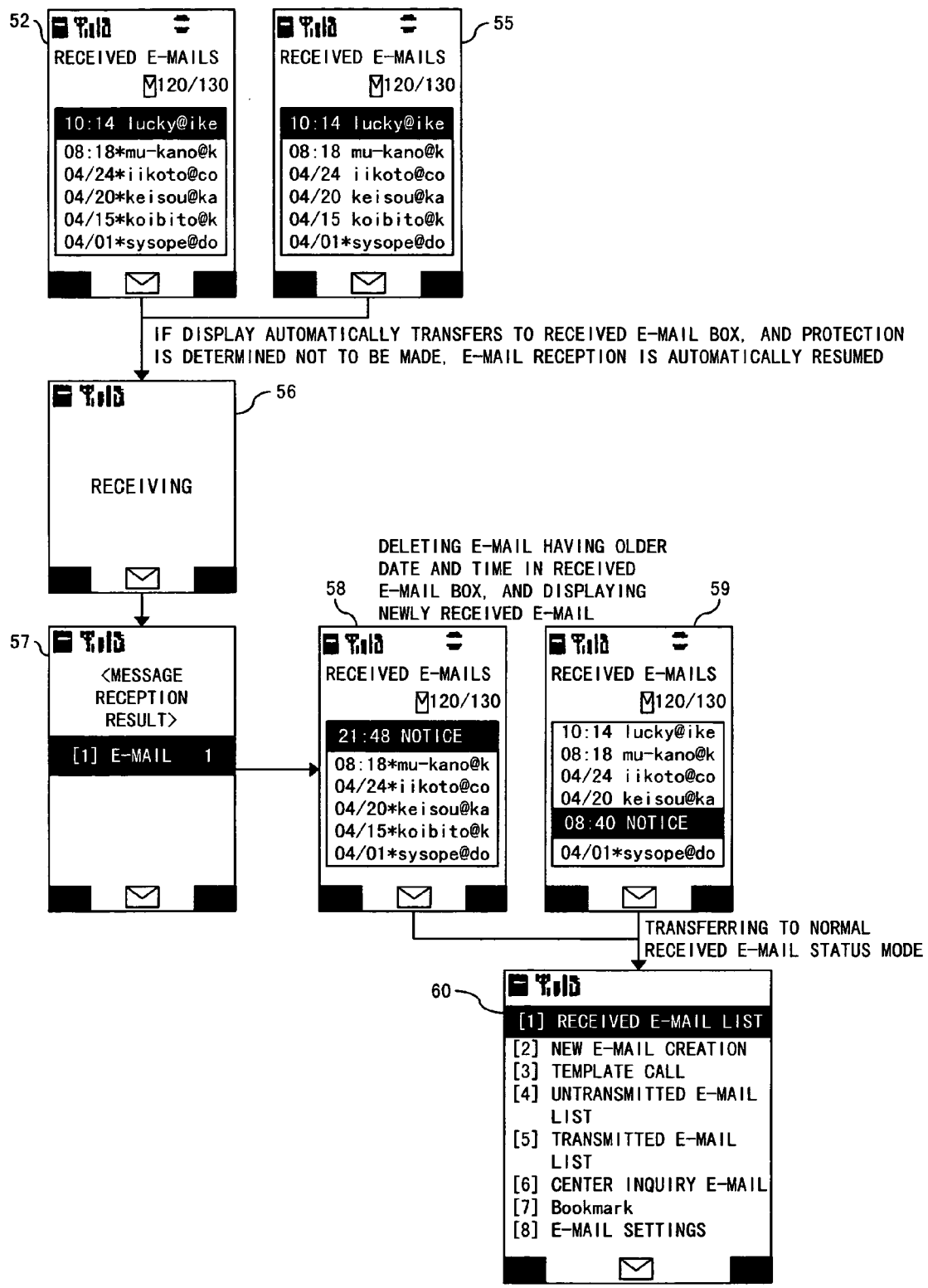
FIG. 6 exemplifies screens displayed on the display unit of the cellular phone during the process shown in FIG. 3 (No. 3)

The process shown in FIG. 3 is first described also with reference to FIGS. 4 to 6.

Note that FIGS. 4 to 6 exemplify the screens displayed on the display unit 27 of the cellular phone 20 during the process shown in FIG. 3.

Normally, a stand-by screen like a screen 41 shown in FIG. 4 appears on the display unit 27 of the cellular phone 20.

When an electronic mail is received, a message indicating "receiving" like a screen 42 shown in FIG. 4 is first displayed (step S11). When an electronic mail distribution process is executed next (step S12, YES), the newly received electronic mail is distributed to a corresponding folder within the received electronic mail box 26 (step S13). The received electronic mail is distributed, for example, to a folder such as a "family", "friends", "work" folder, etc., or a protection folder according to the transmitter of the received electronic mail. For example, if the received electronic mail is an electronic mail transmitted from any family member, it is distributed to the "family" folder. Such a distribution destination corresponding to transmitter is prespecified/preregistered by a user as a matter of course.

However, if all of newly received electronic mails cannot be captured in the received electronic mail box 26, the distribution process is not executed yet.

Namely, it is determined whether or not all of received electronic mails can be captured in the received electronic mail box 26 (step S14). If empty space corresponding to the number of received electronic mails or more exists in the received electronic mail box 26, all of the received electronic mails can be captured in the received electronic mail box 26 without any problems ("YES" in step S14). The number of received electronic mails can be determined based on their subjects, and header information such as a transmission source, etc., which are transmitted from the electronic mail server initially.

Or, even if empty space corresponding to the number of received electronic mails or more does not exist, it is determined that all of the received electronic mails can be captured in the received electronic mail box 26 when a countermeasure can be taken, for example, by making a deletion sequentially from an existing electronic mail having an older date with a conventional automatic electronic mail deletion function ("YES" in step S14).

However, there may be cases where all of new electronic mails cannot be captured unless protection of an existing electronic mail is released, as described above.

For example, if all of existing electronic mails within the received electronic mail box 26 can be set to be protected, a new electronic mail can be captured for an initial time period by automatically deleting an existing electronic mail other than a protected electronic mail even if the received electronic mail box becomes full. However, if a user forgets to release an electronic mail once protected, or feels it troublesome to release a protected electronic mail, the number of protected electronic mail gradually increases, and finally, a situation where the received electronic mail box 26 becomes full and all of its existing electronic mails are set to be protected can possibly occur. If such a situation occurs, these existing electronic mails cannot be deleted with an automatic electronic mail deletion function unless the protection is released.

Accordingly, in this case, even if the number of received electronic mails is only one, this electronic mail cannot be captured in the received electronic mail box 26. If the number of received electronic mails is plural, all of the received electronic mails cannot be captured in the received electronic mail box 26 in a situation where empty space corresponding to the number of received electronic mails or more cannot be secured even with the automatic electronic mail deletion function when the received electronic mail box 26 is full, and all of existing electronic mails are set not to be protected. For example, if 3 new electronic mails are received in a situation where space for two electronic mails is empty although all of existing electronic mails in the received electronic mail box 26 are set to be protected, all of the received electronic mails cannot be captured in the received electronic mail box 26.

Or, assume that the "protection folder and secret" setting is enabled particularly in the case where the received electronic mail box 26 is configured not to be able to protect all of its existing electronic mails as explained in the conventional techniques, but to impose a certain restriction such as restricting the maximum number of protected electronic mails to be stored to 50. In this case, if the protection folder is full, or empty space for capturing all of electronic mails to be distributed to the protection folder does not exist when electronic mails to be distributed to the protection folder are received, it is determined in this preferred embodiment that these electronic mails cannot be captured in the received electronic mail box 26 ("NO" in step S14), although the electronic mails are captured in the received electronic mail box 26 by being distributed to a folder other than the protection folder with the conventional techniques.

If all of the received electronic mails can be captured in the received electronic mail box 26 ("YES" in step S14), a process for capturing all of the received electronic mails in the received electronic mail box 26 is executed, and thereafter, an electronic mail reception result, for example, like a screen 43 shown in FIG. 4 is displayed (step S15). Then, a display like a screen 44 is made to allow the received electronic mail box to be listed and displayed immediately (step S16). Namely, an electronic mail reception process in a normal case where no problems exist is executed.

Or, if all of the received electronic mails cannot be captured in the received electronic mail box 26 due to the above described reason ("NO" in step S14), a display of electronic mail reception status such as the number of received electronic mails, the number of electronic mails that can be captured, the number of electronic mails that cannot be captured, etc., for example, like a screen 45 or 46 shown in FIG. 4 is made (step S17). Since header information, etc. are transmitted from a mail server as described above, the number of received electronic mails can be determined based on these information items. Furthermore, by determining the number of empty electronic mails, and the number of electronic mails that can be deleted with the automatic deletion function in the received electronic mail box 26, the number of electronic mails that can be captured, and the number of electronic mails that cannot be captured can be calculated and displayed.

A screen 45 exemplifies a screen in the case where no electronic mails can be captured when the number of received electronic mails is 5. A screen 46 exemplifies a screen in the case where 2 electronic mails can be captured but 3 electronic mails cannot be captured when the number of received electronic mails is 5.

In the case where no electronic mails can be captured ("YES" in step S18), for example, a notification that the received electronic mail box 26 is full is made, and a message indicating a countermeasure "Release protection" is displayed as indicated by a screen 47 shown in FIG. 4 (step S19). In the meantime, in the case where at least one electronic mail can be captured but electronic mails that cannot be captured exist ("NO" in step S18), a notification of the number of electronic mails that cannot be captured is made, and at the same time, a message indicating a countermeasure "Release protection" is displayed as indicated by a screen 48 shown in FIG. 4 (step S20).

As described above, an explicit message indicating "Release protection" is displayed, whereby an especially unfamiliar user can take a countermeasure without confusion in comparison with the case where a message indicating that the received electronic mail box 26 is full is simply issued as conventional. Additionally, the number of electronic mails that cannot be captured is displayed, so that a user can learn the minimum number of electronic mails for which protection must be released so as to capture all of received electronic mails. How to make a notification to a user is not limited to the above described examples of displaying the messages. For instance, a notification may be made as a voiced message.

As described above, a user can take a countermeasure without confusion in judgment in a situation where protection must be first released to capture a newly received electronic mail, such as in the case where the received electronic mail box 26 is full and all of existing electronic mails are set to be protected.

Furthermore, the present invention reduces the troublesomeness of user operations with the process to be described below.

Firstly, options "Release protection" and "Abort" are displayed on the screen 47 or 48 shown in FIG. 4. If a user selects/specifies the option "Abort" ("NO" in step S21), the electronic mail reception process is terminated, and the display transfers to the state of the screen 44.

In the meantime, if the user selects/specifies "Release protection" ("YES" in step S21), a process for transferring the display to a protection release operation screen is automatically executed. Namely, a process for transferring to the received electronic mail box 26 is first executed (step S22). As a result, a screen 49 shown in FIG. 5 is displayed.

As described above, the display automatically transfers to the received electronic mail box 26, which eliminates a user need to perform an operation for transferring to the received electronic mail box 26 every time, leading to a reduction in the troublesomeness of user operations. If the received electronic mail box 26 is configured not to be able to protect all of its existing electronic mails as described above, the display transfers to the protection folder and existing electronic mails within the protection folder are listed and displayed. The display that transfers to the protection folder is also described as a transfer to the received electronic mail box 26 here.

Then, after the user is made to select an electronic mail for which protection is to be released (step S23), and the protection of the selected electronic mail is released (step S24), electronic mails stored in the received electronic mail box 26 are listed and displayed (step S25).

Processes in steps S23 to S25 are described with reference to FIG. 5.

Firstly, when the user specifies a submenu on the screen 49, a display is switched to the submenu like a screen 50. When one electronic mail is released, a user selects/specifies "protection*/release" as indicated by the screen 50, and the display transfers to a screen 52. Then, the user selects/specifies an electronic mail for which protection is to be released from the electronic mail list (step S23). In response to this selection/specification, the protection of the selected electronic mail is released (step S24), and the state after being released is listed and displayed like a screen 52 (step S25). As indicated by the screen 52, the electronic mail for which protection has been released is displayed without a mark (*) which indicates protection. This is the description mainly for the case where the number of electronic mails that cannot be captured is 1, and accordingly, this does not correspond to the examples of screens 45 and 46.

In the meantime, if the user desires to release protection together for a plurality of electronic mails, he or she first selects/specifies "Select plural" as indicated by a screen 51. As a result, the display transfers to a screen 53. The user then selects/specifies a plurality of electronic mails for which protection is to be released from the electronic mail list. Thereafter, the user specifies the submenu, and the display again switches to the submenu screen like a screen 54. The user then selects/specifies "Protection*/release", so that the protection of the plurality of selected electronic mails is released. The state after being released is listed and displayed as indicated by a screen 55. The electronic mails for which protection has been released are displayed without a mark (*) which indicates protection as indicated by the screen 55.

After the process in step S25, the electronic mail reception process is automatically resumed. Namely, the process restarts from step S11. Firstly, in step S11, a "receiving" screen like a screen 56 shown in FIG. 6 is displayed. Then, processes in steps S12 to S14 are executed. Since the electronic mails for which protection has been released exist at this time, the determination made in step S14 results in "YES" (unless the number of electronic mails for which protection has been released is equal to or larger than the number of received electronic mails, the determination results in "NO" as a matter of course), a process for capturing a new electronic mail while deleting the electronic mails for which the protection has been released is executed, and its result is displayed (screen 57 shown in FIG. 6) (step S15). Then, electronic mails within the received electronic mail box 26 are listed and displayed (screen 58 or 59 shown in FIG. 6) (step S16).

Note that the screen 57 does not correspond to the examples of the screens 45 and 46 similar to the screen 52, and shows an example where the number of newly received electronic mails is 1.

With the process in step S15, a deletion is sequentially made from an electronic mail having the oldest date and time among electronic mails for which protection has been released in an automatic manner by the number of newly received electronic mails, and then, a newly received electronic mail is captured.

If the number of electronic mails for which protection has been released is 1 as indicated by the screen 52 when the number of newly received electronic mails is 1 as in the above described example, this electronic mail is deleted, and the newly received electronic mail is captured. Therefore, the state like the screen 58 is displayed in step S16.

Additionally, if the number of electronic mails for which protection has been released is 5 as indicated by the screen 55, only an electronic mail having the oldest date and time among the 5 electronic mails is deleted, and the newly received electronic mail is captured. Accordingly, the state like the screen 59 is displayed in step S16. Normally, new electronic mails are received one after another. Therefore, by releasing the protection of electronic mails the number of which is larger than the number of received electronic mails, newly received electronic mails can be captured as usual without any problems for some time without performing a protection release operation. Naturally, a deletion is made sequentially from an electronic mail having the oldest date and time among the remaining 4 electronic mails at that time.

Thereafter, the display transfers to a normal received electronic mail status mode (screen 60).

Up to this point, the process executed when an electronic mail is received is described.

Next, a process executed when an inquiry is made to center, which is a mail server, is described below with reference to FIGS. 7 to 10.

In case of a cellular phone, when a new electronic mail is transmitted, a center, which is a mail server, automatically transmits this electronic mail to the cellular phone in normal cases. At this time, the above described "process executed when an electronic mail is received" is executed. However, if the electronic mail cannot be received at this time due to the reason that the cellular phone is turned off, radio wave conditions are bad, "Abort" is selected in the process in step S21, or the like, a user side actively makes an inquiry to the center to receive the electronic mail. The user can learn that the electronic mail yet to be received exists in the center, because pictographic characters indicating this fact are displayed.

Here, the process executed when an inquiry is made to the center in such a situation is described.

FIG. 7 is a flowchart for explaining the process executed by the communications terminal.

Figure 8:
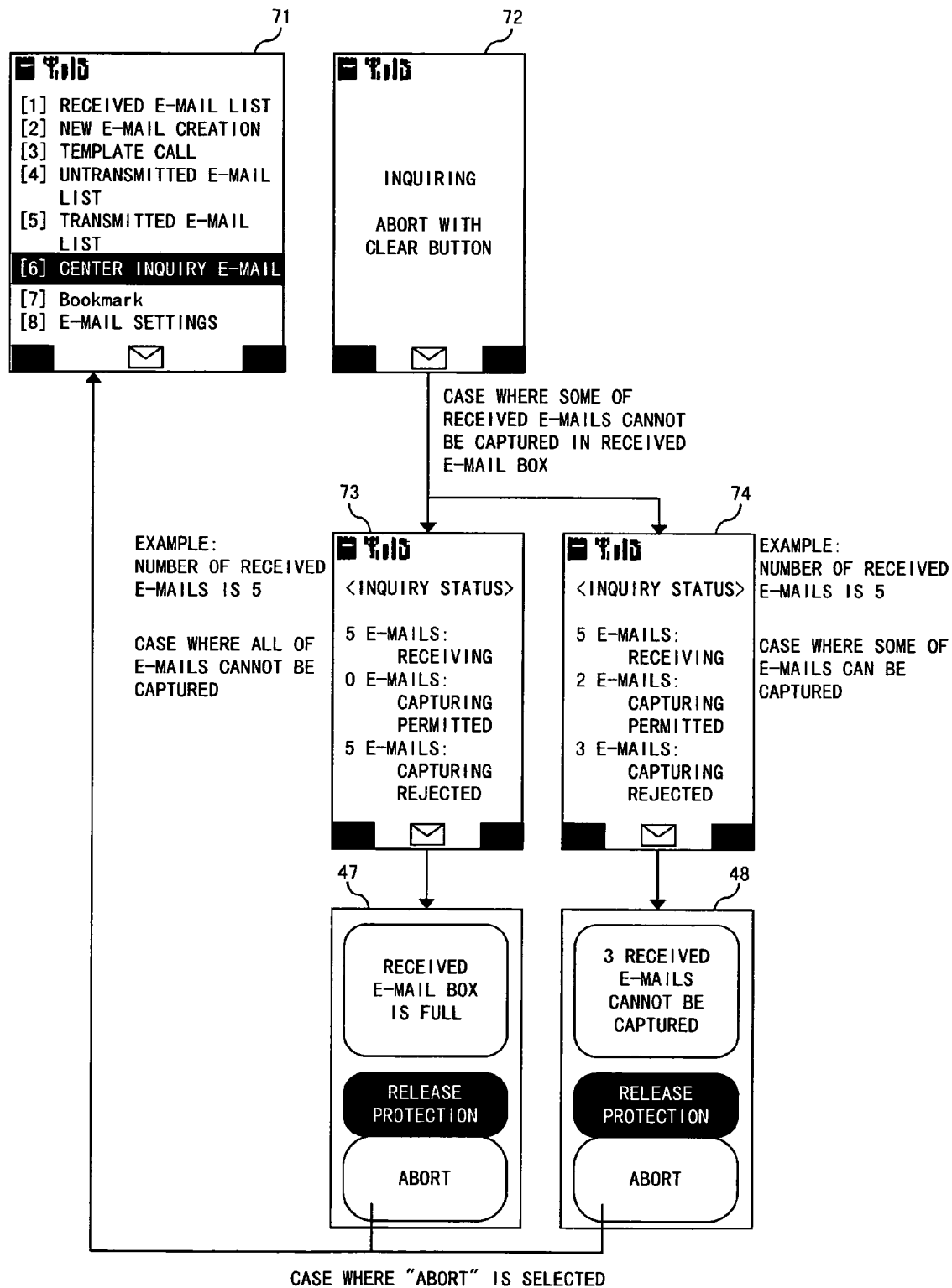
FIG. 8 exemplifies screens displayed on the display unit of the cellular phone during the process shown in FIG. 7 (No. 1)
Figure 9:
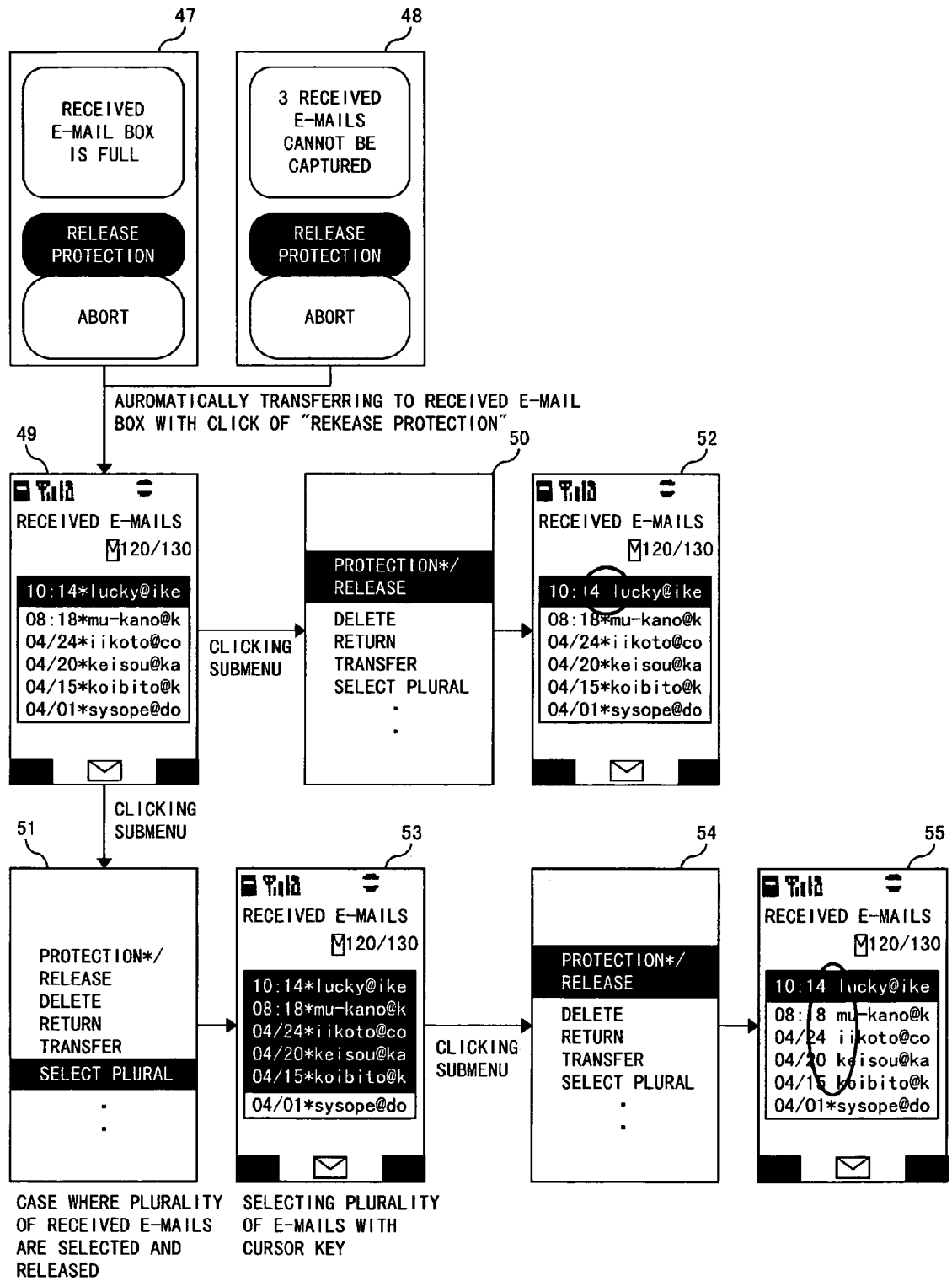
FIG. 9 exemplifies screens displayed on the display unit of the cellular phone during the process shown in FIG. 7 (No. 2)
Figure 10:
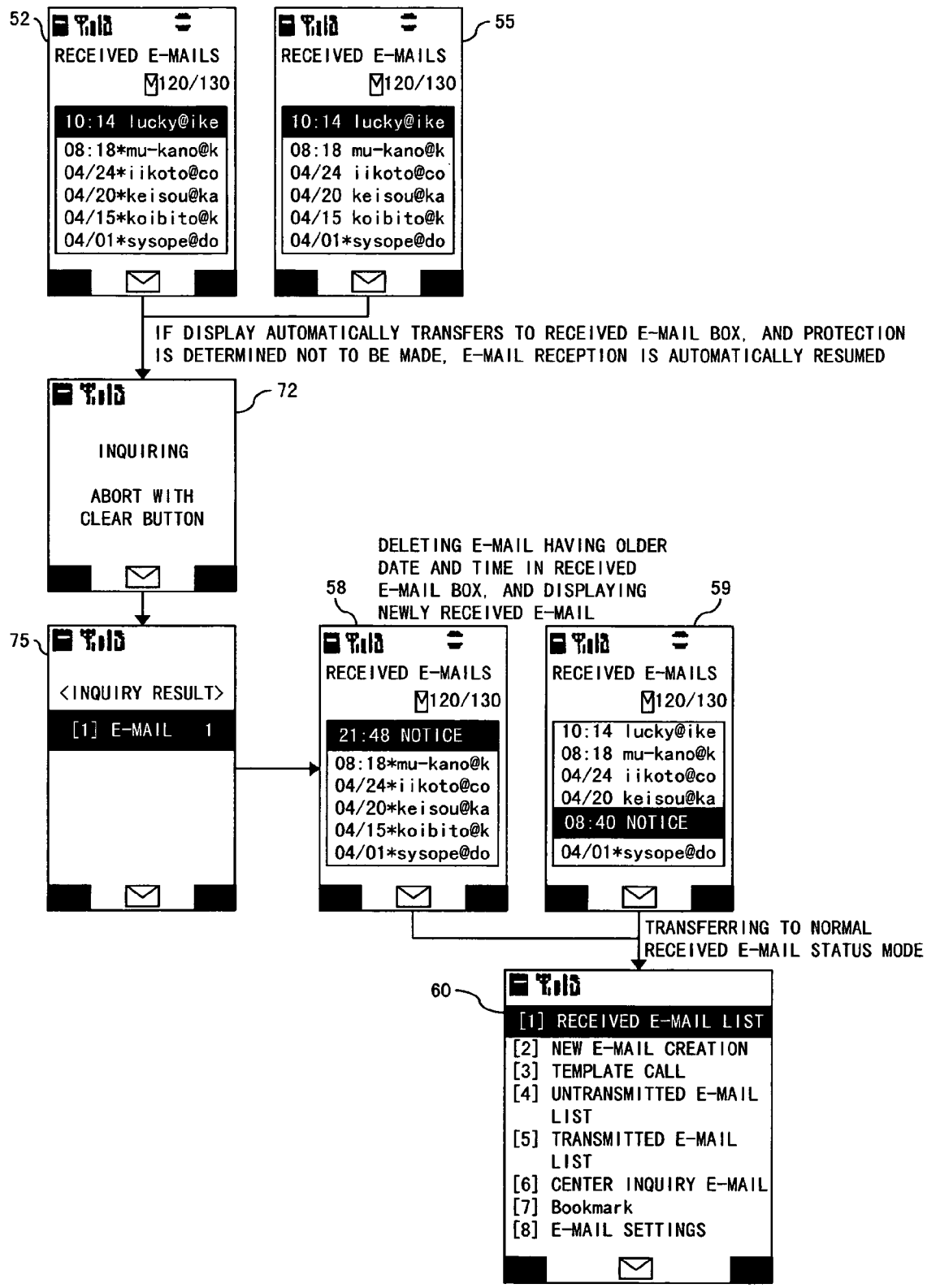
FIG. 10 exemplifies screens displayed on the display unit of the cellular phone during the process shown in FIG. 7 (No. 3)

FIGS. 8 to 10 exemplifies the screens displayed on the display unit 27 of the cellular phone 20 during the process shown in FIG. 7.

The process shown in FIG. 7 is the same as that shown in FIG. 3 except for some portions.

Also the display screens shown in FIGS. 8 to 10 are the same as those shown in FIGS. 4 to 6 except for some of them.

Accordingly, only different portions are referred to, and descriptions of the same portions are omitted here. Among the display screens shown in FIGS. 8 to 10, the same screens as those shown in FIGS. 4 to 6 are denoted with the same reference numerals.

The process shown in FIG. 7 starts when a user selects/specifies a "center inquiry mail" in a menu as indicated by a screen 71 shown in FIG. 8.

In the process shown in FIG. 7, processes different from those in FIG. 3 are steps S31, S35, and S37.

Firstly, with the process in step S31, not the display of "receiving" but a display indicating "inquiring" like a screen 72 shown in FIG. 8 is made.

Additionally, with the process in step S35, a display of an "inquiry result" like a screen 75 shown in FIG. 10 is made, although the display of the "message reception result" is made on the screen 57 shown in FIG. 6.

Furthermore, with the process in step S37, a display of "inquiry status" like screens 73 and 74 shown in FIG. 8 is made, although the display of the "electronic mail reception status" is made on the screens 45 and 46 shown in FIG. 4.

In the above described examples, the processes are executed according to the number of electronic mails. However, the processes are not limited to these implementations. The processes may be executed according to the amount of a new electronic mail and empty space of the received electronic mail box 6.

Up to this point, the description is provided by taking a cellular phone as an example. However, as described above, the present invention is not limited to a cellular phone, and is applicable to all of communications terminals having an electronic mail function. Since such communications terminals having an electronic mail function comprise a controlling unit, a memory, etc., and implement functions such as electronic mail transmission/reception, etc. by executing a program, they can be defined as one type of computers. These computers implement the above described electronic mail receiving method and the functions of the communications terminal by executing a program stored in a storing unit. Or, the above described functions may be implemented by externally reading this program, for example, from an arbitrary storage medium, particularly, a portable storage medium, and by executing the program, or by downloading the program from an external information processing device via a network with the use of a communication function.

FIG. 11 exemplifies the hardware configuration of a computer that implements the above described various types of processes. The example shown in this figure is a configuration of a personal computer, etc., but the hardware configuration is not limited to this example.

The computer 80 shown in FIG. 11 comprises a CPU 81, a memory 82, an input device 83, an output device 84, an external storage device 85, a medium driving device 86, a network connecting device 87, etc., which are interconnected by a bus 99. The configuration shown in this figure is merely one example, and is not limited to this one.

The CPU 81 is a central processing unit that controls the entire computer 80.

The memory 82 is a memory such as a RAM, etc., which temporarily stores a program or data stored in the external storage device 85 (or on the portable storage medium 89) when the program is executed. The CPU 81 executes the above described various types of processes by using the program/data read in the memory 82.

The input device 83 is, for example, a keyboard, a numeric keypad, a touch panel, etc.

The output device 84 is, for example, a display device such as a display unit, etc.

The external storage device 85 is, for example, a hard disk device, etc., and stores a program/data, etc. for implementing the above described various types of functions. Or, the program/data, etc. may be stored onto the portable storage medium 89, and the medium driving device 86 may read the program/data, etc. stored onto the portable storage medium 89, and the computer 80 may be made to execute the above described various types of processes. The portable storage medium 89 is, for example, an FD (Flexible Disk), a CD-ROM, a DVD, a magneto-optical disk, a memory card, a small memory card, etc.

The network connecting device 87 is configured to make a connection to a network such as the Internet, and to enable the transmission/reception of a program/data, etc. to/from an external information processing device.

FIG. 12 exemplifies downloading from the storage medium on which the program is recorded, and downloading of the program.

As shown in this figure, the program/data may be read by inserting the portable storage medium 89 on which is recorded the program/data for implementing the above described functions of the present invention into the main body of the computer 80, stored in the memory 82, and executed. Or, as the above described program/data, a program/data 91 stored in a computer 90 on an external program/data provider side may be downloaded via a network 92 such as the Internet, etc.

The present invention is not limited to a device and a method, and can be configured as a storage medium itself (the portable storage medium 89, etc.) on which the above described program/data is recorded, or as the above described program itself, especially a program (propagation signal) downloaded via the network.

As described above in detail, with the electronic mail receiving method, device, program, etc. according to the present invention, a user can release protection without confusion if a situation where the user cannot take a countermeasure with a normal automatic electronic mail deletion function when a new electronic mail is captured, and protection must be released occurs in a communications terminal, and besides, troublesomeness of operations for releasing the protection can be reduced.

Furthermore, the present invention can prevent a problem that an electronic mail is not made secret and can be possibly viewed by another person although "protection folder and secret" setting is enabled.

What is claimed is:

1. An electronic mail receiving method for use in a communications terminal having an electronic mail reception function, comprising making to a user a notification that protection must be released if a state where a new electronic mail cannot be captured unless the protection of an existing electronic mail is released is determined, when the new electronic mail is received, or an inquiry is made to a mail server;

obtaining a minimum number of existing electronic mails for which protection is to be released so as to capture a new electronic mail;

displaying the obtained minimum number and a message for making a user select existing electronic mails for which protection is to be released; and releasing the protection of selected electronic mails in a lump, when a plurality of electronic mails are selected by the user.

2. The electronic mail receiving method according to claim 1, further comprising displaying a message requesting the user release the protection by transferring display contents to a protection release operation screen after making the notification to the user.

3. The electronic mail receiving method according to claim 1, further comprising capturing a new electronic mail by making a deletion sequentially from an existing electronic mail having an older date among the existing electronic mails for which the protection has been released.

4. The electronic mail receiving method according to claim 1, wherein the state where a new electronic mail cannot be captured unless the protection of an existing electronic mail is released is a state where a received electronic mail box is full and all of existing electronic mails are set to be protected.

5. A communications terminal, comprising:

a display unit;

a determining unit determining a state where a new electronic mail cannot be captured unless protection of an existing electronic mail is released, when the new electronic mail is received, or an inquiry is made to a mail server; and a guidance unit displaying a message that the protection must be released on the display unit, if said determining unit determines the state where the new electronic mail cannot be captured unless the protection of an existing electronic mail is released, and wherein said guidance unit obtains a minimum number of existing electronic mails for which protection is to be released so as to capture a new electronic mail and notifies the user of the obtained number, and displays a message requesting the user release the protection together for a plurality of existing electronic mails if the protection of the plurality of electronic mails is released.

6. A computer-readable storage medium on which is recorded a program to perform an electronic mail receiving method in a communications terminal having an electronic mail reception function, the method comprising making to a user a notification that protection must be released if a state where a new electronic mail cannot be captured unless the protection of an existing electronic mail is released is determined, when the new electronic mail is received, or an inquiry is made to a mail server; obtaining a minimum number of existing electronic mails for which protection is to be released so as to capture a new electronic mail, displaying the obtained minimum number and a message for making a user select existing electronic mails for which protection is to be released, and releasing the protection of selected electronic mails in a lump, when a plurality of electronic mails are selected by the user.

7. The storage medium according to claim 6, the process further comprising displaying a message requesting the user release the protection by transferring display contents to a protection release operation screen after making the notification to the user.

* * * * *